O. W. HENSEL.
SELF FEEDER FOR SAWS.
APPLICATION FILED SEPT. 25, 1917.
1,321,917.
Patented Nov. 18, 1919.
2 SHEETS—SHEET 1.
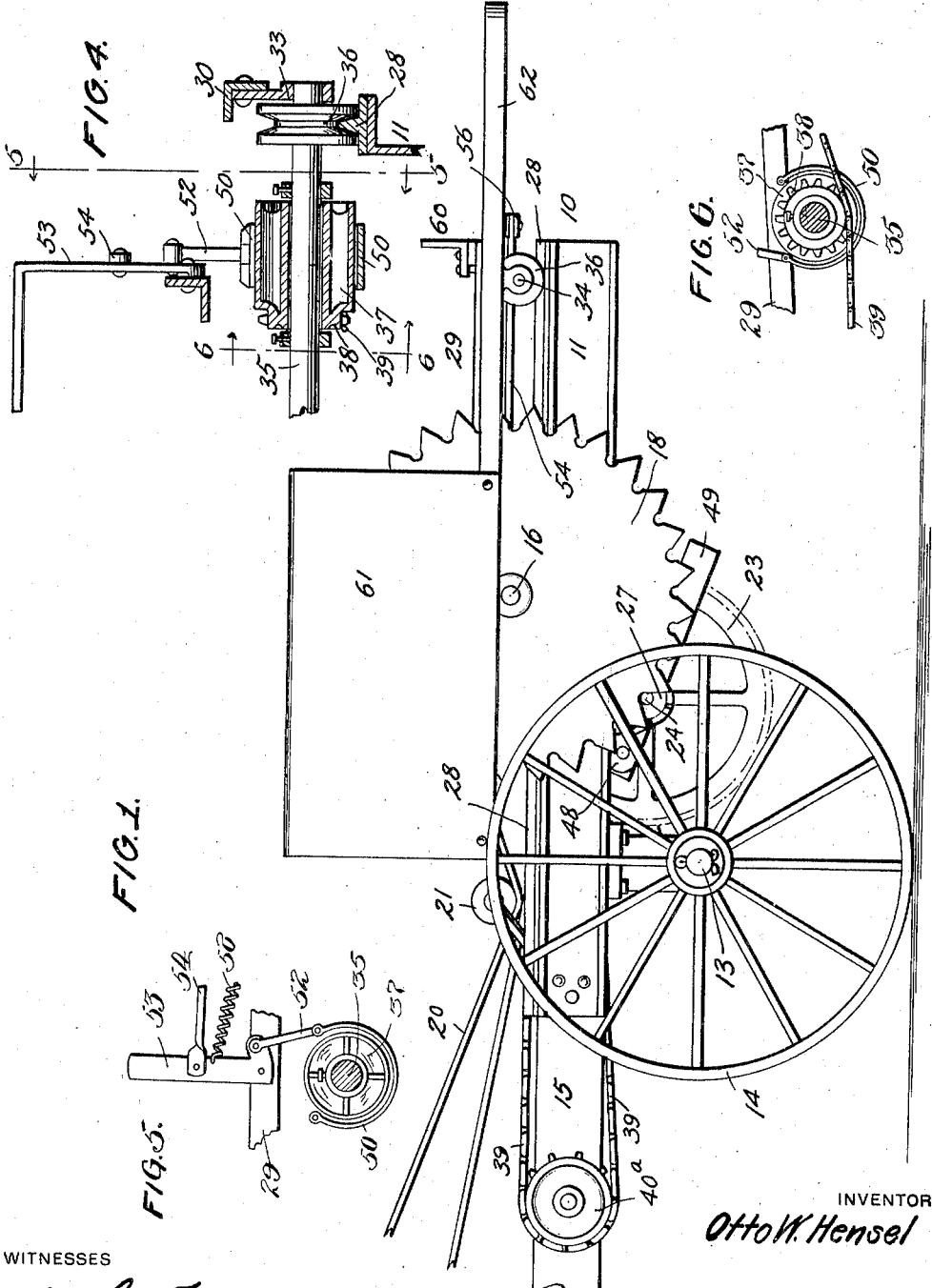
WITNESSES
INVENTOR
Otto W. Hensel
BY
ATTORNEY O. W. HENSEL.
SELF FEEDER FOR SAWS.
APPLICATION FILED SEPT. 25, 1917.
1,321,917.
Patented Nov. 18, 1919.
2 SHEETS—SHEET 2.
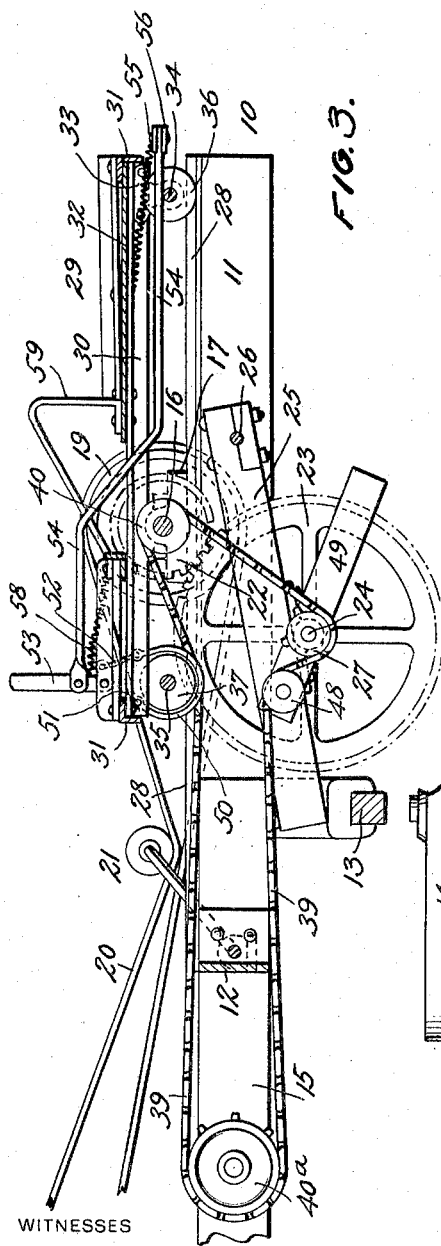
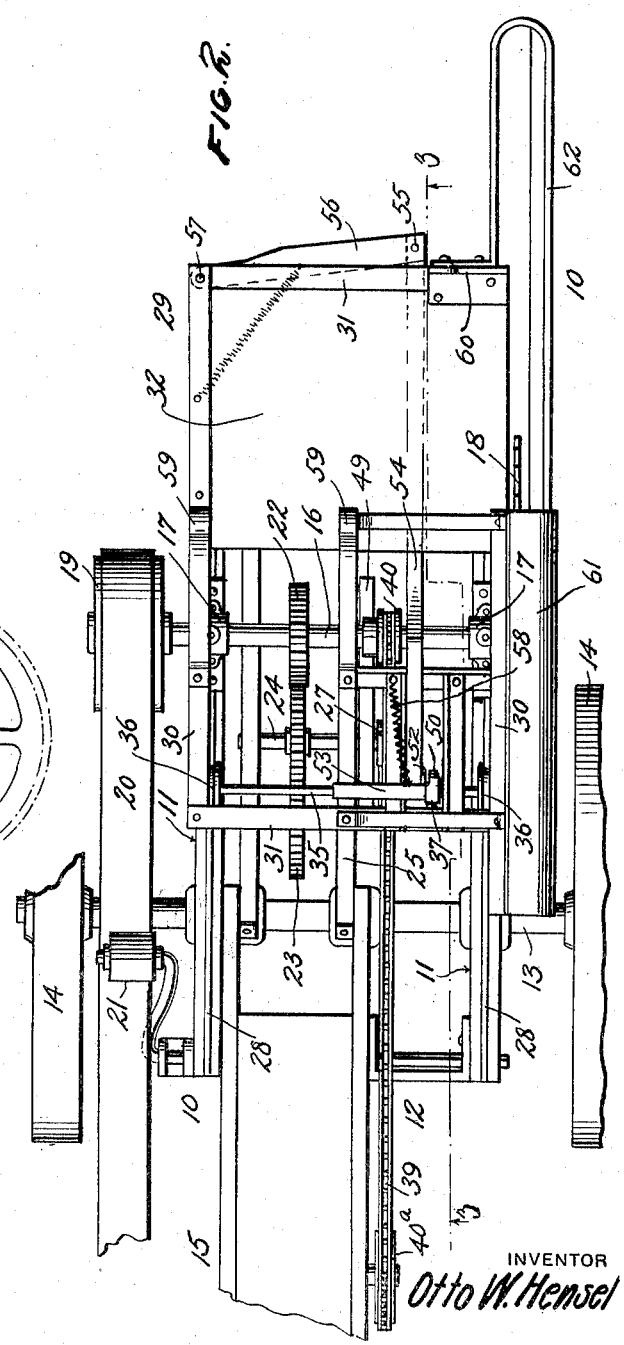
INVENTOR
Otto W. Hensel

UNITED STATES PATENT OFFICE.

OTTO WILLIAM HENSEL, OF LINN GROVE, IOWA.

SELF-FEEDER FOR SAWS.

1,321,917.   Specification of Letters Patent.   Patented Nov. 18, 1919.

Application filed September 25, 1917. Serial No. 193,132.

*To all whom it may concern:*

Be it known that I, OTTO WILLIAM HENSEL, a citizen of the United States, residing at Linn Grove, in the county of Buena Vista and State of Iowa, have invented certain new and useful Improvements in Self-Feeders for Saws, of which the following is a specification.

This invention relates to saw mills and particularly to a self-feeding saw carriage for saw mills, designed primarily for cutting wood into regular lengths, though the feeding device may be used on saw mills of other types.

The principal object of the invention is to provide saw mills with a carriage on which the wood to be cut is placed and held normally away from the saw, but which, upon the operation by the attendant of a clutch, will cause said carriage to be drawn toward the saw and the projecting end of the wood on said carriage quickly cut off, the carriage at the end of its movement being returned by a spring after the clutch has been released.

A further object of the invention is to provide a saw mill such as described, with a self-feeding device for the saw mill carriage which is operated positively by the saw shaft through the medium of a clutch connection which causes the carriage to move longitudinally toward the saw and which upon release of the clutch, will permit the return of the carriage by a spring or other suitable re-acting means.

With the above as the principal objects in view, the invention consists in the novel construction, combination and arrangement of parts hereinafter described, pointed out in the appended claim and illustrated in the accompanying drawings, in which, Figure 1 is a side elevation of a portion of a saw mill with the improved feeding device applied thereto, a portion only of the saw mill frame being shown, Fig. 2 is a top plan view of the mechanism shown in Fig. 1, Fig. 3 is a vertical longitudinal sectional view on the line 3—3 of Fig. 2, and Fig. 4 is a detail sectional view illustrating the clutch mechanism.

Fig. 5 is a detail vertical section taken on the line 5—5 of Fig. 4.

Fig. 6 is a detail vertical section taken on the line 6—6 of Fig. 4.

In the drawings, 10 indicates the saw mill frame which is made in any approved manner, but for the sake of illustration, is here shown as formed of two longitudinal beams 11 made of channel bars connected at suitable points by cross bars 12, said beams being mounted on an axle 13 supported upon the ground wheels 14 which enables the saw mill to be moved about from place to place. However, the frame may be rigidly supported, if desired.

From one end of the frame 10 there extends a supplemental frame 15 parallel to the frame 10, and which is designed in the present instance to carry a motor, not shown, for driving the saw, said motor being operated by steam, electricity or gas, an internal combustion engine being the preferred type.

Extending crosswise of the frame 10 is the main shaft 16 rotating freely in bearings 17 bolted to the top of the beams 11 of the saw frame and having secured on one end a saw 18 and on the opposite end a pulley 19 about which passes a driving belt 20 extending from the motor. The belt 20 is provided with a belt tightener 21 of any approved type for tightening and loosening the belt 20.

Keyed on the main shaft 16 intermediate its ends is a pinion 22 engaging and driving a gear wheel 23 fixed on a short counter shaft 24 turning in bearings secured to longitudinal bars 25 fastened at one end to a cross rod 26 extending between the beams 11 of the frame 10 and bearing at their opposite ends on the axle 13 to which they are secured. The shaft 24 carries a sprocket pinion 27 on one end by means of which the feeding device is driven as will be explained.

On the top of each frame beam 11 is bolted a rail 28 over which travels in a longitudinal direction the saw carriage 29 which, as shown, is formed of two longitudinal angle bars 30 connected together at their ends by cross bars 31. The outer end of the carriage supports a table 32 upon which the wood to be cut into lengths is placed. On the under side of the carriage 29 at each end are secured bearings 33 for cross shafts 34 and 35 which carry grooved wheels 36 that run on and are guided by the rails 28, the grooved wheels embracing the rails for the purpose of preventing the carriage being forced laterally therefrom. On the shaft 35 near one end is mounted to rotate freely, a friction drum 37 on one end of which is a sprocket pinion 38 in the vertical plane of the sprocket pinion 27 and below these two pinions passes a sprocket chain 39, one loop of said sprocket chain embracing an idler pulley 40 turning freely on the saw shaft 16 or otherwise supported, if found more convenient in the construction of the machine. The sprocket chain 39, after passing under or over the pinion 38, extends rearwardly therefrom in a substantially horizontal direction toward the motor and at a suitable distance from the frame 10 it encircles a sprocket wheel 40ª pivoted to the supplemental frame 15 and then back to the sprocket pinion 27, passing over a tightener pulley 48 near the sprocket pinion 27 carried on one end of a bar 49 pivoted on the counter shaft 24. Preferably the bar 49 is of sufficient length on the end opposite the tightener pulley 48 to hold said pulley up against the chain 29 and the latter in secure engagement with the driving sprocket pinion 27.

Surrounding the friction drum 37 is a friction band 50 connected at one end 51 to the carriage 29 and at its other end by a link 52 to a vertical lever 53 that extends sufficiently far above the carriage to enable the attendant to operate the same for the purpose of tightening the friction band around the friction drum 37. As an additional means for operating the lever 53, there is pivoted to it a rod 54 that extends from the lever and below the table 32 to the front of the carriage 29 where it is pivoted at 55 to one end of a bar 56, the opposite end of said bar being pivoted at 57 to one corner of the table. The pivoted end 55 of the bar 56 is normally held outwardly from the front of the table by a spring 58 which also holds the lever 53 in position to release the friction band 50 from the drum 37, but when pressure is applied to the bar 56 or to the lever 53 the band is tightened and firmly grips the drum 37.

Knees 59 are mounted on the carriage 29 at the inner end of the table 32 and project upwardly to prevent wood placed on the carriage from falling or being pushed upon the driving machinery, while an angle plate 60 is bolted to the forward end of the table at the side adjacent the saw to bear upon the wood to be cut and hold it against the saw as it is being automatically fed thereto. A guard 61 is connected to the saw table and extends over the saw while a guard frame 62 projects forwardly from the table as a protection for the attendant.

In the use of the saw mill equipped with the present improvement, the saw shaft and saw rotate very rapidly, between one thousand and two thousand revolutions a minute. It is necessary, therefore, to provide reducing gear for operating the feed and this reduction of speed is met by the pinion 22 and gear wheel 23. The rotation of the gear wheel 23 will through the sprocket pinion 27 on the same shaft, drive the sprocket chain 39 continuously, and when the mill is not cutting and the carriage is in the position shown in the drawings, such movement of the sprocket chain rotates the sprocket pinion 38 and friction drum 37. When a length of wood to be cut has been placed upon the carriage, the attendant pushes against the bar 56 with his body so as to operate the clutch lever 53 through the rod 54, or leaning over the carriage, he operates the lever 53 directly with his hand, thereby tightening the friction band 50. The drum and sprocket pinion 38 being held from rotation by the friction band, the teeth of the sprocket lock with the sprocket chain 39 and the latter draws the saw carriage rearwardly at the same speed as that traveled by the chain, thereby feeding all wood that may be on the carriage to the saw and quickly cutting it. After the wood has been cut, the pressure on the bar 56 is released and through the action of the spring 58 the band 50 disengages the drum 37 and permits the latter to rotate, the carriage being checked in its feeding movement and withdrawn to normal position by a spring 65 connected thereto and to the main frame 10. The rapidity of feed imparted to the carriage can be lessened as desired by varying the pressure on the bar 56 or lever 53 so that the drum may slip more or less within the band 50, this being found convenient under certain conditions and in sawing wood of different kinds.

What is claimed is:

In a feed mechanism, the combination with a pair of frame beams supporting rails, a main shaft mounted in bearings upon said beams and carrying a tool, a work holding carriage passing over said shaft and alongside said tool; cross shafts journaled beneath said carriage and having grooved wheels traveling on said rails, a drum fast on one of said cross shafts and having a sprocket at its extremity, a band loosely inclosing said drum, and lever mechanism for applying the band to the drum when desired; of bearings supported beneath the frame beams, a counter shaft mounted therein, gears connecting this shaft with the main shaft, a driving sprocket on the counter shaft, an idler on the main shaft, an idle sprocket at the remote end of the main frame, a sprocket chain passing around all said wheels and idlers and engaging the sprocket upon said drum, a belt tightener for this chain and means for returning the carriage.

In testimony whereof I affix my signature in presence of two witnesses.

OTTO WILLIAM HENSEL.

Witnesses:
 WALTER R. HENSEL,
 J. E. BULAND.